United States Patent
Boileau et al.

(10) Patent No.: US 12,497,933 B2
(45) Date of Patent: Dec. 16, 2025

(54) PROPULSION ASSEMBLY FOR AN AIRCRAFT COMPRISING A THRUST REVERSER WITH MOVABLE CASCADES AND WITH AN ACTUATOR MOUNTED IN AN OPTIMIZED MANNER

(71) Applicant: SAFRAN NACELLES, Gonfreville-l'Orcher (FR)

(72) Inventors: Patrick André Boileau, Moissy-Cramayel (FR); Gina Ferrier, Moissy-Cramayel (FR)

(73) Assignee: SAFRAN NACELLES, Gonfreville-l'Orcher (FR)

(*) Notice: Subject to any disclaimer, the term of this patent is extended or adjusted under 35 U.S.C. 154(b) by 0 days.

(21) Appl. No.: 18/835,618

(22) PCT Filed: Jan. 31, 2023

(86) PCT No.: PCT/FR2023/050124
§ 371 (c)(1),
(2) Date: Aug. 2, 2024

(87) PCT Pub. No.: WO2023/148449
PCT Pub. Date: Aug. 10, 2023

(65) Prior Publication Data
US 2025/0137418 A1    May 1, 2025

(30) Foreign Application Priority Data
Feb. 4, 2022   (FR) .................................. 2200995

(51) Int. Cl.
*F02K 1/76*   (2006.01)
*F02K 1/72*   (2006.01)

(52) U.S. Cl.
CPC ............... *F02K 1/763* (2013.01); *F02K 1/72* (2013.01)

(58) Field of Classification Search
CPC ............... F02K 1/70; F02K 1/72; F02K 1/763
See application file for complete search history.

(56) References Cited

U.S. PATENT DOCUMENTS

| 4,005,822 A | 2/1977 | Timms | |
| 2015/0260126 A1* | 9/2015 | Caruel | F02K 1/72 239/265.19 |
| 2016/0363097 A1* | 12/2016 | Foutch | F02C 7/24 |

FOREIGN PATENT DOCUMENTS

| EP | 3103995 A2 | 12/2016 |
| FR | 2981989 A1 | 5/2013 |

(Continued)

OTHER PUBLICATIONS

Corresponding International Patent Application No. PCT/FR2023/050124, International Search Report, date mailed May 23, 2023.

*Primary Examiner* — Andrew H Nguyen
(74) *Attorney, Agent, or Firm* — McDonald Hopkins LLC

(57) ABSTRACT

A propulsion assembly for an aircraft equipped with a thrust reverser comprising an actuator for moving a movable structure between an advanced direct thrust position and a retracted thrust reversal position, the propulsion assembly further comprising an actuator support device equipped with a first connecting part for connecting it to the deflection edge and/or to the outer shell of the intermediate casing, with a second connecting part for connecting it to a body of the actuator, and with a central part running axially between the shell and the actuator. Moreover, the actuator support device forms a guide for a set of cascades of the movable structure.

12 Claims, 20 Drawing Sheets

(56) References Cited

FOREIGN PATENT DOCUMENTS

| FR | 2999239 A1 | 6/2014 |
|----|------------|--------|
| FR | 3002785 A1 | 9/2014 |
| FR | 3073572 A1 | 5/2019 |

\* cited by examiner

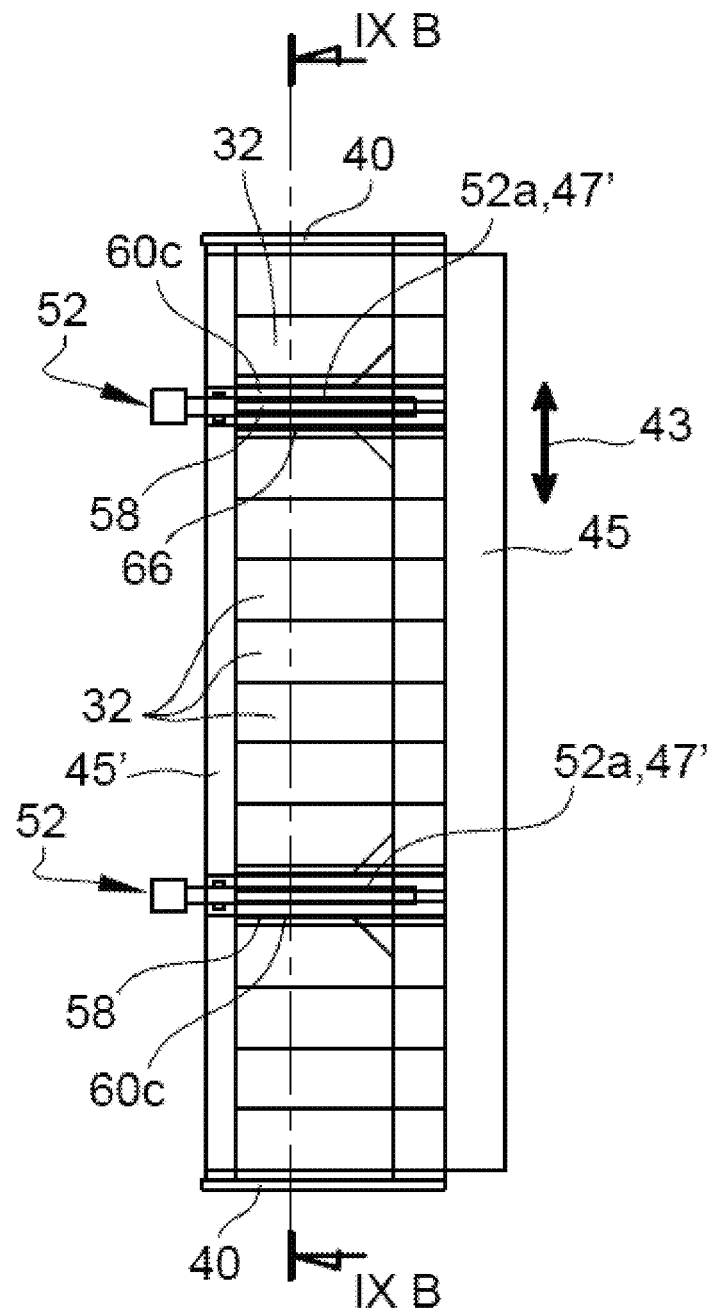

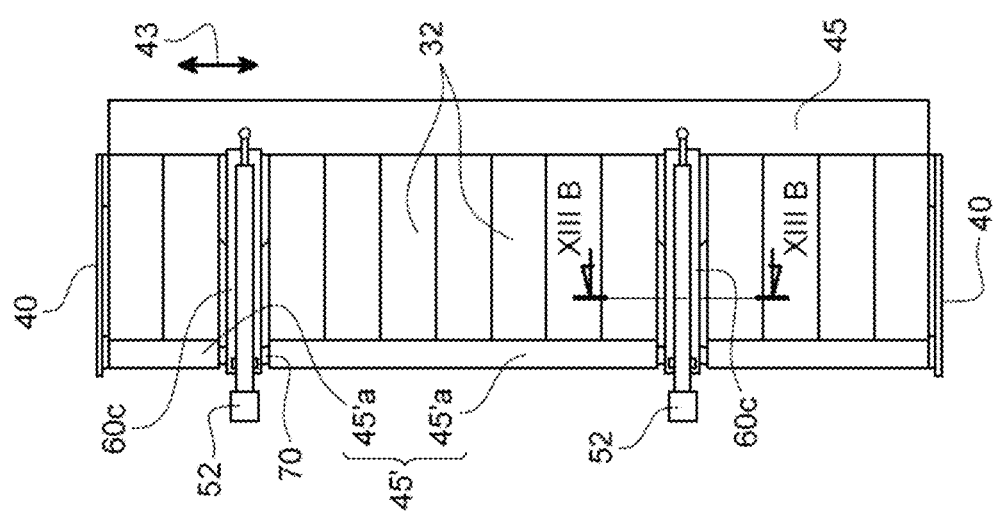

PROPULSION ASSEMBLY FOR AN AIRCRAFT COMPRISING A THRUST REVERSER WITH MOVABLE CASCADES AND WITH AN ACTUATOR MOUNTED IN AN OPTIMIZED MANNER

CROSS-REFERENCE TO RELATED APPLICATIONS

This is the National Stage application of PCT international application PCT/FR2023/050124, filed on Jan. 31, 2023, which claims the priority of French Patent Application No. 2200995, filed Feb. 4, 2022, both of which are incorporated herein by reference in their entireties.

TECHNICAL FIELD

The invention relates to the field of nacelles and thrust reversers for an aircraft propulsion unit, and, more specifically, to nacelles fitted with movable cascade reversers.

PRIOR ART

Thrust reversers are devices used to divert the flow of air passing through the propulsion unit towards the front, so as to shorten landing distances and limit the load on the brakes on the landing gear.

Cascade reversers currently used in the aviation sector comprise a front frame forming together with the vanes a fixed part of the reverser intended to be connected to a turbomachine casing.

More recent technical developments have enabled movable cascade reversers to be developed, such as described, for example, in documents FR2981989A1, FR2999239A1, FR3002785A1 and FR3073572A1.

Compared to a conventional fixed-vane reverser, the ability of the vanes to move makes it possible to reduce the length of the nacelle, and, consequently, to reduce its mass and the drag it produces.

In designs with movable cascades, the installation of the actuators and the support means thereof is complicated by the small space available in the zone dedicated to the right of the fan casing and the outer shell of the intermediate casing, when such an intermediate casing is provided. In addition, it is necessary to respect certain constraints such as le fact of not placing the actuators around the parts of the fan casing which are subject to deformation in the case of an accidental situation involving a loss of fan blades (case of an FBO "Fan Blade Out").

These constraints, among others, complicate the installation of actuators and the support means thereof. There is therefore a need to optimise this installation, so as to meet the constraints set out above, while guaranteeing a suitable recovery of the forces of the actuators through appropriate connection points of the engine structure.

DISCLOSURE OF THE INVENTION

In order to meet this need, the invention relates to is a propulsion unit for an aircraft fitted with a turbomachine and a nacelle comprising a thrust reverser, according to the characteristics of claim 1.

The invention provides an optimised solution for the installation of the actuator and the support device thereof, adapting to the small space available in the dedicated area. Indeed, the support device travels upstream under the actuator, from the first connection part on the support structure which is preferably the deflection edge and/or an intermediate casing outer shell, which constitute appropriate connection points of the engine structure to transfer the forces from the actuator.

Furthermore, when such an intermediate casing shell is provided, which constitutes a preferred solution of the invention, but remaining optional, the proposed solution allows moving the actuator and the support device thereof away from the parts of the fan casing subject to a deformation in the case of accidental situations of the FBO type.

Still according to the invention, the actuator support device forms guide means for the set of vanes. Thus, this advantageously allows the actuator support device to be used to fulfil an additional function, namely that of guiding the set of vanes during its movement between the advanced direct thrust position and the rearward reverse thrust position. Thus, this advantageously allows the actuator support device to be used to fulfil an additional function, namely that of guiding the set of vanes during its movement between the advanced direct thrust position and the rearward reverse thrust position.

The invention preferably has at least one of the following optional technical features, either separately or in combination.

Preferably, the actuator support device has no mechanical connection with the fan cowls and other nacelle cowls.

Preferably, as previously mentioned, said support structure is the deflection edge and/or an outer shell of the intermediate casing fixed to the fan casing and extending the latter downstream. Of course, in the case where the support structure is formed only of the deflection edge, the outer shell of the intermediate casing remains only optional within the design of the propulsion unit, the deflection edge can indeed be directly fixed on the fan casing by extending the latter downstream.

Preferably, when such an outer shell of the intermediate casing is provided, the actuator support device extends at least partially between this intermediate casing outer shell, and the actuator.

Preferably, the central part of the actuator support device has the shape of an axially extending beam.

Preferably, the propulsion unit comprises at least one member for supporting the actuator support device, connecting the latter to the fan casing, each support member preferably taking the form of a connecting rod. Nevertheless, the actuator support device can remain cantilevered upstream, without the use of a support member. In this regard, it is noted that the support member can be configured to produce a support either during the normal operation of the propulsion unit, including in direct jet and/or in reverse jet, or only in reverse jet, or even only during an abnormal operation of the propulsion unit, for example in an FBO ("Fan Blade Out") situation, following a loss of fan blade.

Preferably, the second connection part is arranged around the fan casing, in the vicinity of a junction between this fan casing and the intermediate casing outer shell.

According to a first preferred embodiment, the guide means includes an axial guide track formed on a radially outer surface of the central part of the actuator support device, the guide track cooperating with a complementary axial guide track provided on the set of vanes.

Preferably, the complementary axial guide track is formed on a radially inner surface of an axial inter-vane element arranged between two vanes of the assembly of vanes, this axial inter-vane element preferably taking the form of an axial sheath internally housing at least one part of the actuator.

According to a second preferred embodiment, the guide means includes an axial guide lumen crossed by a sliding bridge, connecting two adjacent angular sectors of the front structure for supporting the vanes, these two adjacent angular sectors being arranged on either side of the actuator in a circumferential direction of the propulsion unit.

According to a third preferred embodiment, the guide means includes two axial guide rails, cooperating respectively with two complementary sliding members, respectively secured to two adjacent angular sectors of the front structure for supporting the vanes, these two adjacent angular sectors being arranged on either side of the actuator in the circumferential direction of the propulsion unit.

Preferably, in the second and third preferred embodiments, the propulsion unit includes at least one fixed fan cowl support member, carried by the actuator support device and protruding radially outwardly relative to the set of vanes.

Preferably, the second connection part of the actuator support device cooperates with a rear end portion of the body of the actuator, preferably via a cardan connection.

Other advantages and features of the invention will become apparent in the non-limiting detailed description below.

BRIEF DESCRIPTION OF THE DRAWINGS

The following detailed description refers to the accompanying drawings in which:

FIG. 9A is a side view of the reverser fitted to the front part shown in FIGS. 7 and 8, shown in direct thrust configuration;

FIG. 13A is a side view of the reverser fitted to the front part shown in FIGS. 11 and 12, shown in direct thrust configuration;

DESCRIPTION OF THE EMBODIMENTS

Figure 1:
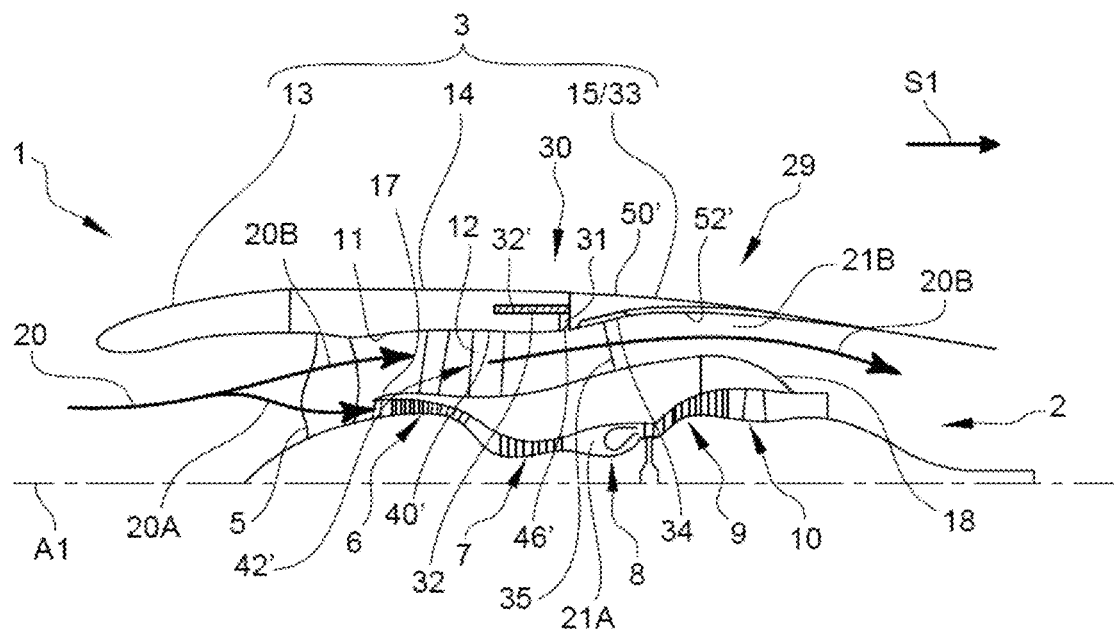
FIG. 1 is a schematic half-view in longitudinal section of a propulsion unit, comprising a thrust reverser shown in direct thrust configuration.
Figure 2:
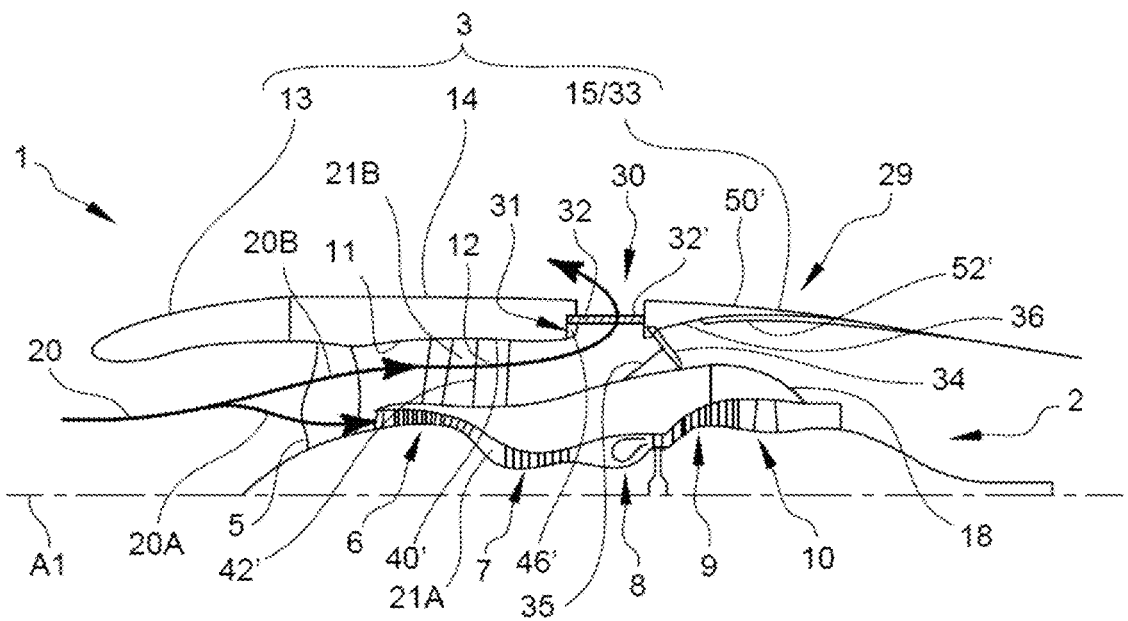
FIG. 2 is a schematic longitudinal sectional half-view of the propulsion unit shown in FIG. 1, with the reverser shown in reverse thrust configuration.

FIGS. 1 and 2 show an aircraft propulsion unit 1, having a central longitudinal axis A1.

Hereinafter, the terms "upstream" and "downstream" are defined with respect to a general direction S1 of gas flow through the propulsion unit 1 along the axis A1 when it generates a thrust. These terms "upstream" and "downstream" could respectively be replaced by the terms "front" and "rear" with the same meaning.

The propulsion unit 1 comprises a turbomachine 2, a nacelle 3 as well as a pylon (not shown), intended to connect to the propulsion unit 1 to a wing (not shown) of the aircraft.

In this example, the turbomachine 2 is a twin-spool turbofan engine comprising, from front to rear, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator. The turbofan engine 2 is provided with a fan casing 11 connected to the gas generator by structural arms 12.

The nacelle °3 comprises a front section forming an air inlet °13, a middle section which includes two fan cowls °14 enveloping the fan casing °11, and a rear section °15.

In operation, an air flow 20 enters the propulsion unit 1 through the air inlet 13, passes through the fan 5 and then splits into a primary flow 20A and a secondary flow 20B. The primary flow 20A flows in a primary gas flow path 21A passing through the gas generator. The secondary flow 20B flows in a secondary flow path 21B surrounding the gas generator. The secondary flow path 21B is delimited radially inwards by a fixed inner fairing which surrounds the gas generator. In this example, the fixed inner fairing comprises a first portion 17 belonging to the middle section 14, and a second portion 18 extending backwards from the first portion 17, so as to form part of the rear section 15.

This second portion 18 forms an integral apart of a fixed structure of a thrust reverser which will be described below. This same portion will hereinafter be referred to as the radially inner delimiting wall 18 of the secondary flow path 21B.

Radially outwards, the secondary flow path 21B is delimited by the fan casing 11, and, in the configuration shown in FIG. 1, by one or more movable reverser cowls 33 forming part of the rear section 15 of the nacelle 3, which will be described below. More specifically, between the fan casing 11 and the reverser cowls 33, it is preferably provided here an outer shell 40' of an intermediate casing 42', the latter comprising the aforementioned structural arms 12, whose radially outer end is fixed on this shell 40'. It therefore also helps delimit the secondary flow path 21B radially outwards, being located in the downstream axial extension of the fan casing 11.

The nacelle 3 therefore has a thrust reverser 30 centred on the axis A1 and comprising, on the one hand, a fixed structure 31, and, on the other, a structure 29 that can be moved relative to the fixed structure 31.

The fixed structure 31 of the reverser comprises a deflection edge 46' carried fixedly downstream by the outer shell 40' of the intermediate casing, and therefore being located in the downstream extension of this shell 40'. Moreover, this shell 40' as well as the fan casing 11 can be considered as part of the fixed structure 31 of the reverser. Radially inwards, the fixed structure 31 also comprises the radially inner delimiting wall 18 of the secondary flow path 21B. Alternatively, the deflection edge 46' could be carried directly by the downstream end of the fan casing 11, so as to extend the latter axially downstream.

For its part, the movable structure 29 comprises the aforementioned movable reverser cowls 33, for example two cowls 33 each extending over an angular range of around 180°. This configuration with two cowls 33 is particularly well suited to a nacelle design where the cowls/walls 18 are also mounted in an articulated manner, such that the reverser 30 then has a so-called "D-duct" structure. In this structure, the cowls 18, 33 are connected so as to open/shut simultaneously during maintenance operations on the engine. However, other structures are possible, such as a so-called "C-duct" structure or a so-called "O-duct" structure.

Each reverser cowl 33 has a radially outer wall 50' forming a nacelle outer aerodynamic surface, as well as a radially inner wall 52', helping to delimit the secondary flow path 21B radially outwards.

In addition to the aforementioned reverser cowls 33, the movable structure 29 comprises at least one assembly 32' of cascade vanes 32, these being arranged adjacently in a circumferential direction of the reverser and propulsion unit.

FIG. 1 shows the reverser 30 in a direct thrust configuration. In this configuration, the two movable cowls 33 and the two assemblies of vanes 32' respectively associated with them are in a closed position, or forward position, a so-called forward direct thrust position of the movable structure 29. In this same position, the vanes 32 are housed in a space delimited radially inwards by the deflection edge 46', the intermediate casing outer shell 40', and possibly by the fan casing 11. This space is also delimited radially outwards by the fan cowls 14. In direct thrust configuration, the movable structure 29 bears axially forwards against the deflection edge 46', which thus enables the secondary flow 20B to be channelled towards the back of the propulsion unit 1 so as to generate thrust.

FIG. 2 shows the same reverser 30 in a reverse thrust configuration. In this configuration, the movable reverser cowls 33 and the entire movable structure 29 are in an open position, or rearward position, in which the cowls 33 are longitudinally distant from the deflection edge 46' so as to define a radial opening of the secondary flow path 21B. The vanes 32 extend through this radial opening. In this reverse thrust configuration, shutter flaps 34 are deployed radially in the secondary flow path 21B via links 35, so as to direct the secondary flow 20B towards the vanes 32. These allows directing the flow thus redirected towards the front of the propulsion unit 1, with the aim of generating the desired counter-thrust.

Thus, in FIG. 2, the vanes 32 and the movable cowls 33 of the movable system 29 are shown in a rearward position, corresponding to the rearward reverse thrust position of the movable structure 29. The latter can therefore be moved in translation relative to the fixed structure 31 along the axis A1, between the two positions shown in FIGS. 1 and 2.

Figure 3:
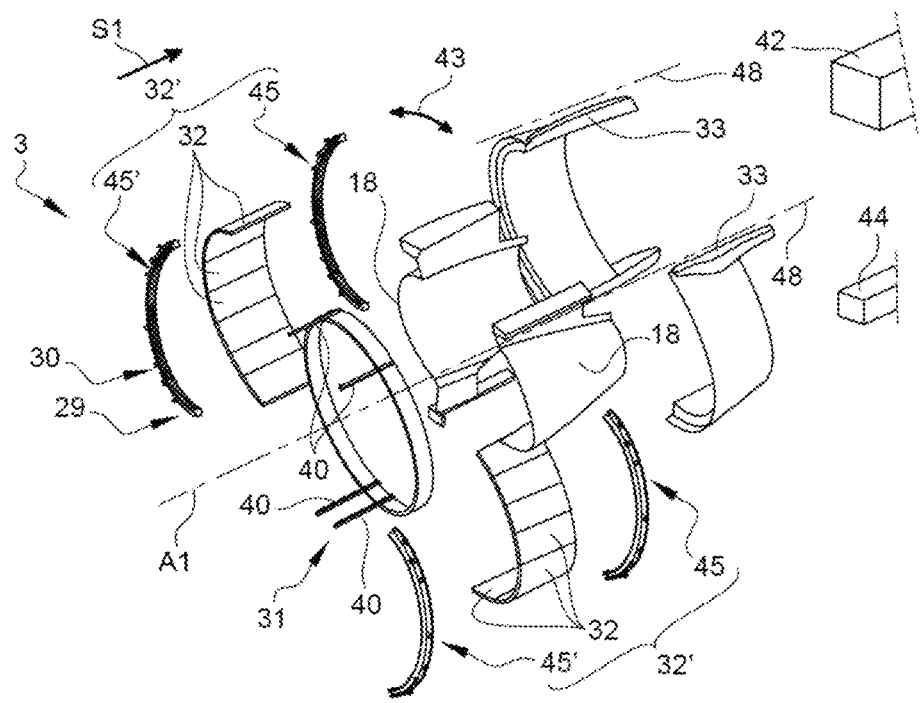
FIG. 3 is an exploded perspective view of part of the nacelle of the propulsion unit shown in the preceding figures, showing in particular the elements of the thrust reverser.

FIG. 3 is an exploded perspective view of certain elements of the nacelle 3, including part of the fixed structure 31 of the reverser 30, which has the general shape of a ring centred on the axis A1, also corresponding to the central longitudinal axis of the reverser. In this preferred embodiment of the invention, the fixed structure 31 is fitted with elements for guiding the vanes 32 as they move between the forward and rearward positions, these elements comprising axial rails 40. For example, these are two rails 40 integral with an upper part of the ring, and two other rails 40 integral with a lower part of this same ring. Here, the rails 40 are fixed to the fixed structure 31 by their rear end, whilst their front end is fixed to another casing (not shown in FIG. 3). The rails 40 thus provide, at the circumferential ends of the sets of vanes 32' a function of guiding the vanes 32 during the axial movement thereof, but also, in the reverse thrust configuration, a function for recovering aerodynamic, mainly radial and tangential, forces.

FIG. 3 schematically shows the vanes 32, which follow one another in the circumferential direction 43. Here, they are grouped into two lateral assemblies each comprising a plurality of vanes 32, these two assemblies being referred to as assemblies of cascade vanes 32'. Alternatively, a single continuous set of vanes can be provided, for example by linking the two aforementioned lateral sets to a time position at 6 o'clock or at 12 o'clock.

Figure 4:
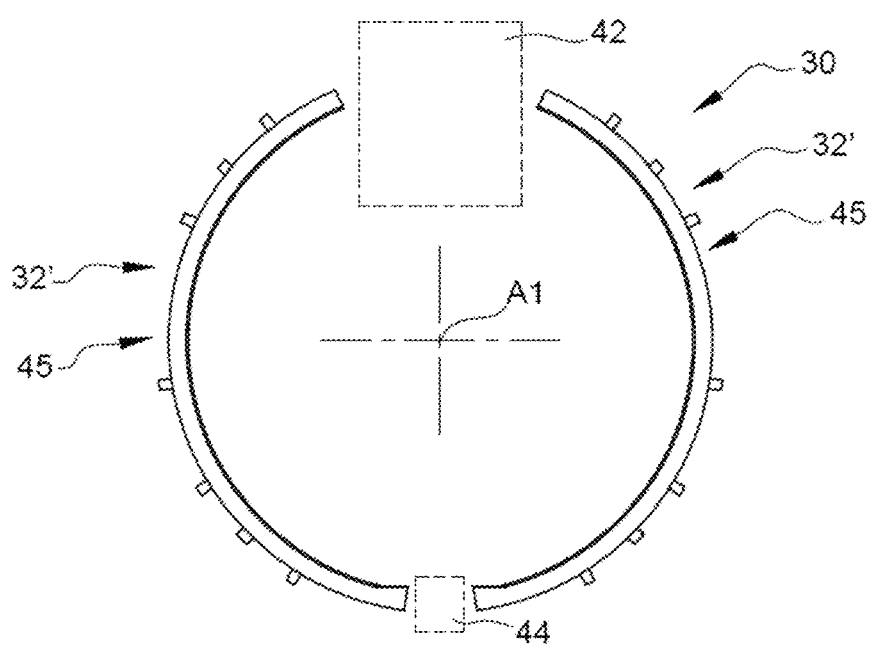
FIG. 4 is an axial view of the rear vane support structures shown in the preceding figure.

Thus, each assembly of vanes 32' has a plurality of cascade vanes 32, and extends over an angular range close to 180°. The two assemblies 32' are preferably separated laterally from each other at their ends facing each other in pairs, to provide upper and lower spaces respectively intended for the passage of the pylon 42 and a lower longitudinal beam 44. Each assembly of vanes 32' also has a rear vane support structure 45 to which a rear end of each of the cascade vanes 32 of the assembly 32' is attached, and a front vane support structure 45' to which a front end of each of these cascade vanes 32 of the assembly 32' is attached. The rear and front structures 45, 45' are also called "rear and front vane frames", and they each extend circumferentially all along their associated lateral assembly 32', in an identical or similar angular sector as shown in FIG. 4. The rear end of each vane 32 is therefore intended to be fixed to its associated rear structure 45 using conventional fixing means, just as the front end of each vane 32 is intended to be fixed to its associated front structure 45' also using conventional means.

As stated above, this configuration is particularly well suited to a so-called "D-duct" structure, which is preferable for the present invention.

In a known manner, the fixed structure 31 also has members (not shown) forming radial and/or tangential and/or axial stops for the vanes 32 of the assemblies 32'.

In FIG. 3, the elements of the nacelle 3 are completed by the articulated cowls 18, 33, giving the nacelle a "D-duct" structure. In particular, the pivot axis 48 associated with each reverser cowl 33 has been shown, this pivot axis 48 being parallel or substantially parallel to the axis A1, and enabling the cowl 33 to be rotatable between an open maintenance position and a closed flying position, shown in FIG. 3.

Figure 5:
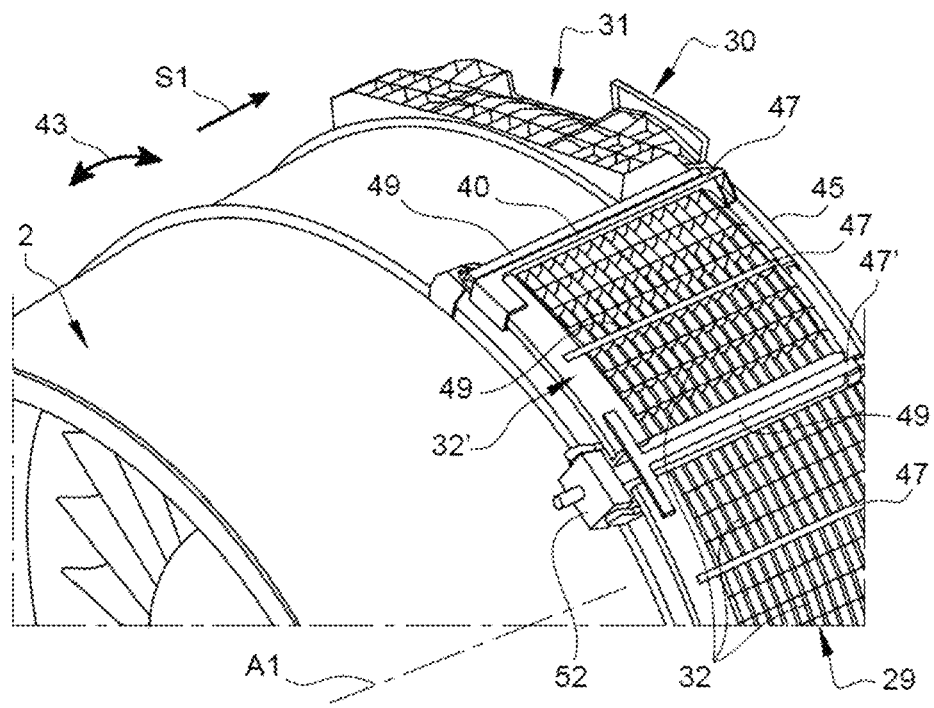
FIG. 5 is a partial perspective view, in more detail, of part of the reverser shown in the preceding figures.

FIG. 5 shows part of one of the two assemblies of vanes 32' in more detail. The two assemblies 32' are preferably identical or similar in design, being symmetrical with respect to a vertical and longitudinal plane passing through the axis A1. Consequently, hereinafter, the description provided will apply equally to each of these two assemblies 32'.

The set of vanes 32' comprises axial inter-vane elements 47, 47' arranged between the vanes 32, in the circumferential direction 43 of the nacelle and the reverser 30 thereof, and also corresponding to the circumferential direction of the propulsion assembly, relative to the axis A1. These inter-vane axial elements 47, 47' extend over all or part of the axial length of the assembly 32', and are thus arranged between the vanes 32. With the radially outer surface 49 thereof, these elements 47, 47' can form axial sliding tracks for the movable system 29, as will be detailed below. Moreover, there can be various types of elements, including first elements 47 which act as a mechanical connection between the vanes 32, and second elements 47' that provide an additional function of mechanical reinforcement for an actuator 52 of the reverser. The reinforcement 47' can take the form of an axial sheath internally housing at least one part of the actuator 52, the purpose of which is to move the movable structure 29 between its advanced direct thrust position, and its rearward reverse thrust position. Other types of reinforcement elements can, nevertheless, be envisaged without departing from the scope of the invention. In addition, it should be noted that in a known manner, the rear end of the actuators 52 is designed to be fixed to the rear support structure 45 using dedicated fixing members.

Figure 6:
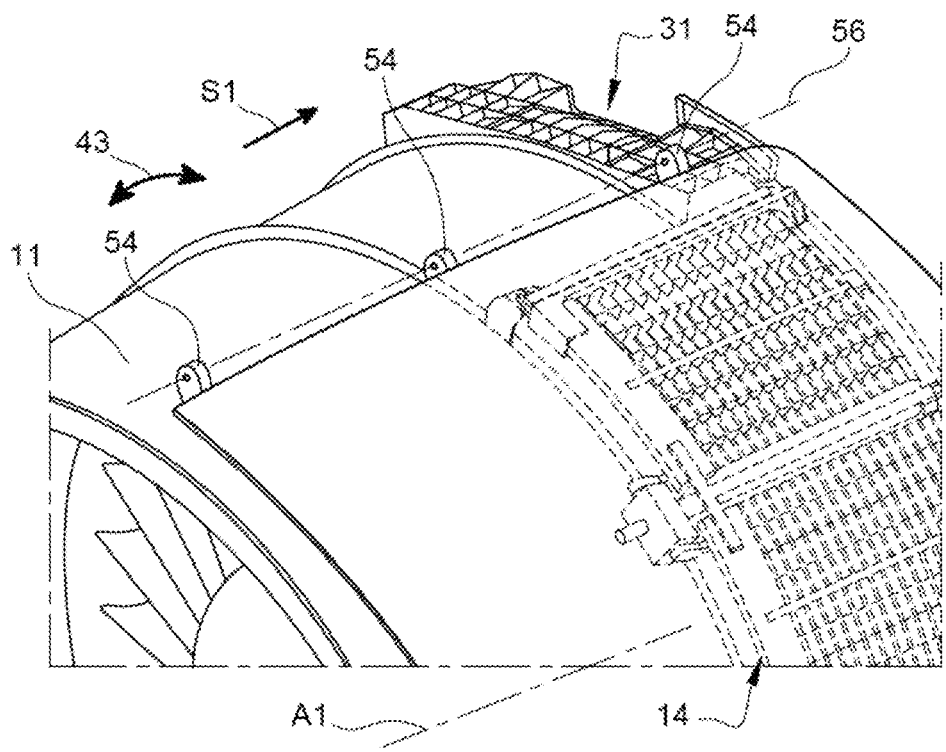
FIG. 6 is a partial perspective view, in more detail, of a front part of the nacelle shown in the preceding figures, with a single fan cowl shown.

With reference now to FIG. 6, one of the two fan cowls 14 is shown which has the feature here of being pivotally mounted between an open maintenance position, and a closed flying position, shown in FIG. 6. The pivoting assembly is carried out using hinges 54 spaced which are axially paced apart from each other, and which together define a pivot axis 56 of the cowl 14. This axis 56 is parallel to the axis A1, or substantially parallel to the latter. Symmetrical mounting is provided for the second pivoting fan cowl (not shown in FIG. 6). However, a solution involving fixed fan cowls is also covered by the present invention.

Figure 7:
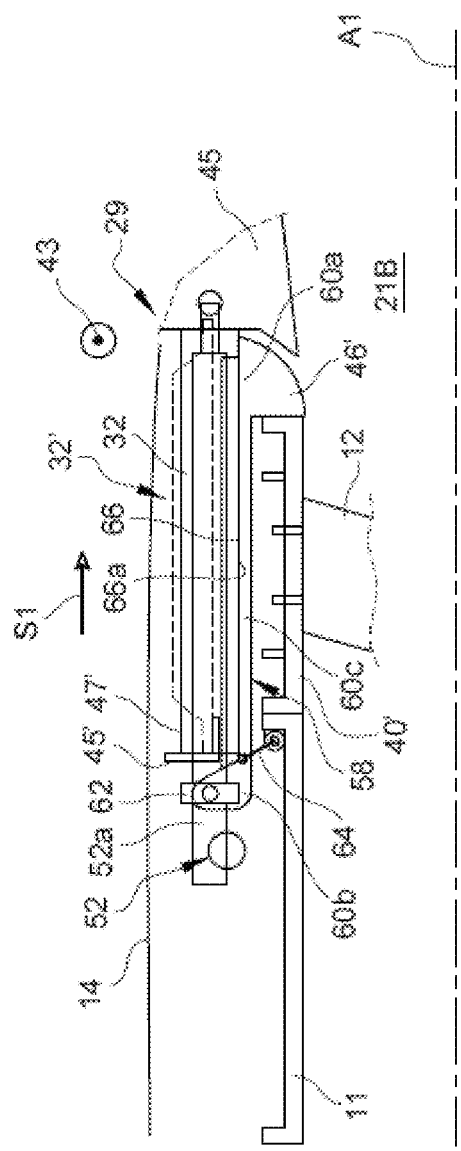
FIG. 7 is a schematic half-view in longitudinal section of a front part of the propulsion unit shown in FIG. 1, more detailed and according to a first preferred embodiment of the invention, and still with the reverser in direct thrust configuration.
Figure 8:
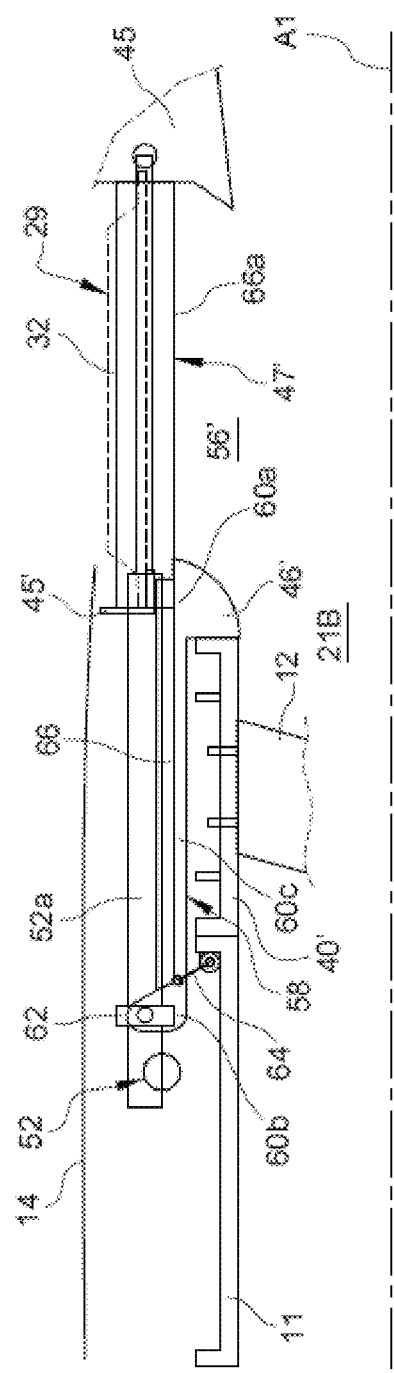
FIG. 8 is a schematic half-view in longitudinal section of a front part of the propulsion unit shown in FIG. 7, with the reverser in reverse thrust configuration.
Figure 9B:
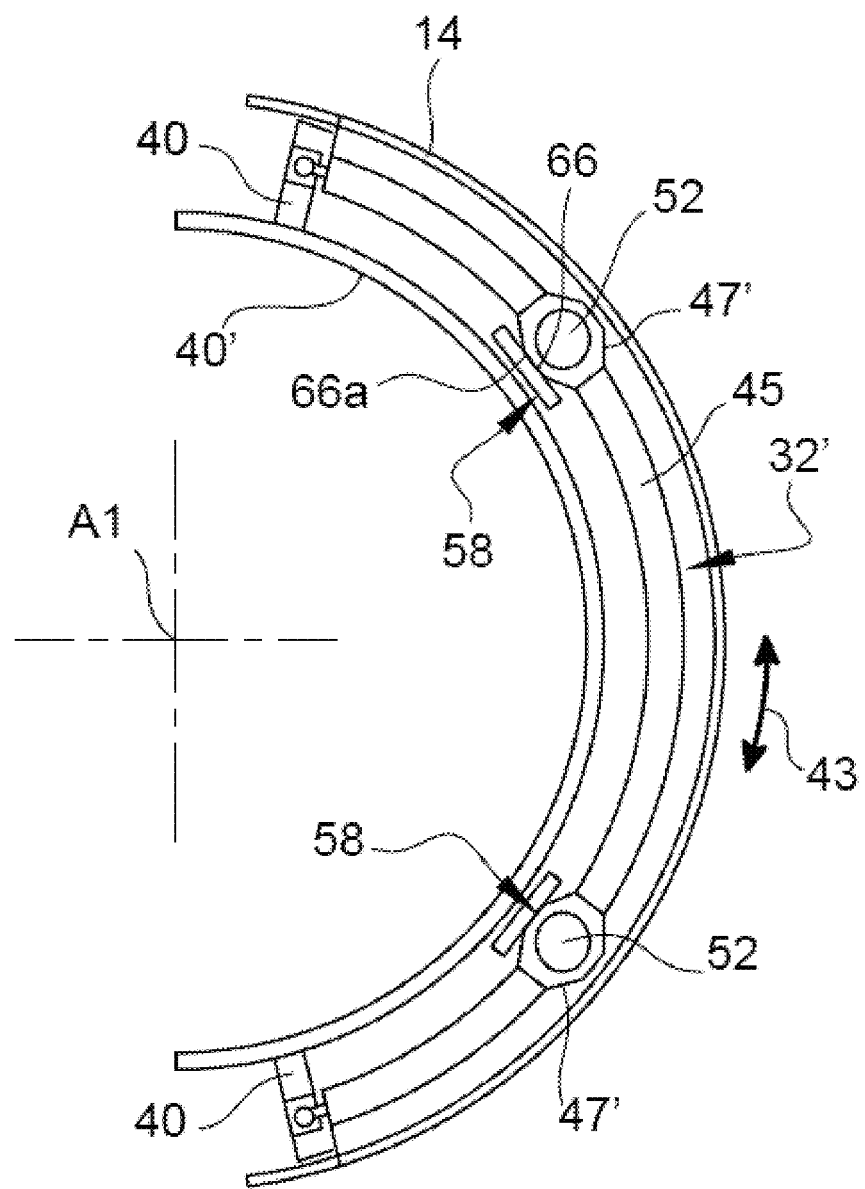
FIG. 9B is a sectional view taken along the line IXB-IXB of FIG. 9A.
Figure 9C:
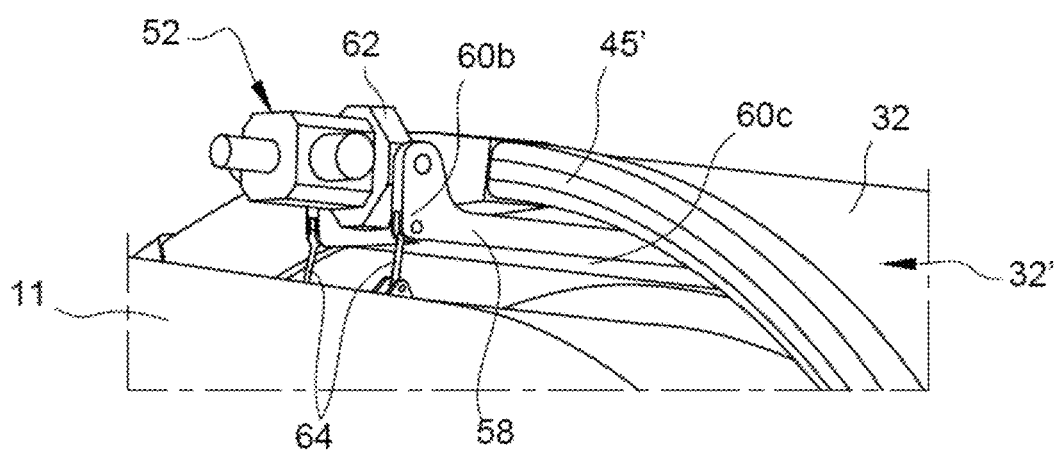
FIG. 9C is a perspective view of a part of the reverser shown in FIGS. 7 to 9B.
Figure 10:
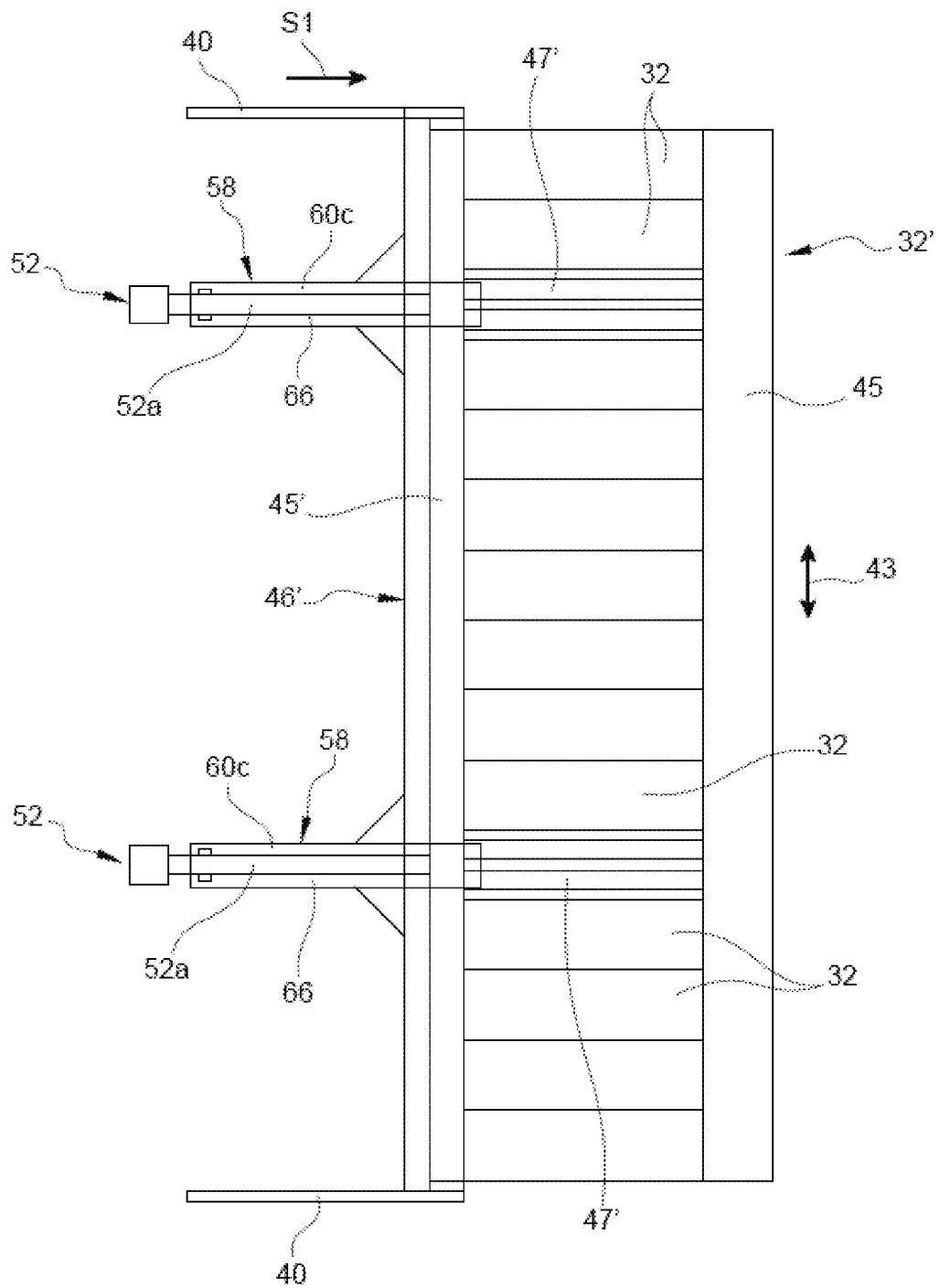
FIG. 10 is a side view similar to that of FIG. 9A, with the reverser in rearward reverse thrust configuration.
Figure 11:
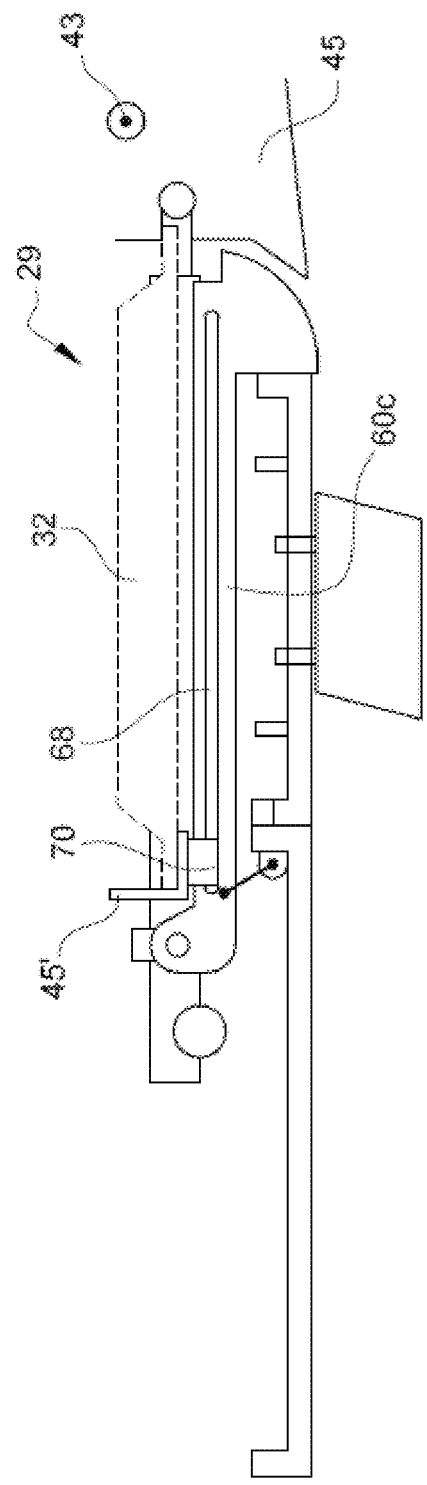
FIG. 11 is a schematic half-view in longitudinal section of a front part of the propulsion unit shown in FIG. 1, more detailed and according to a second preferred embodiment of the invention, and still with the reverser in direct thrust configuration.
Figure 12:
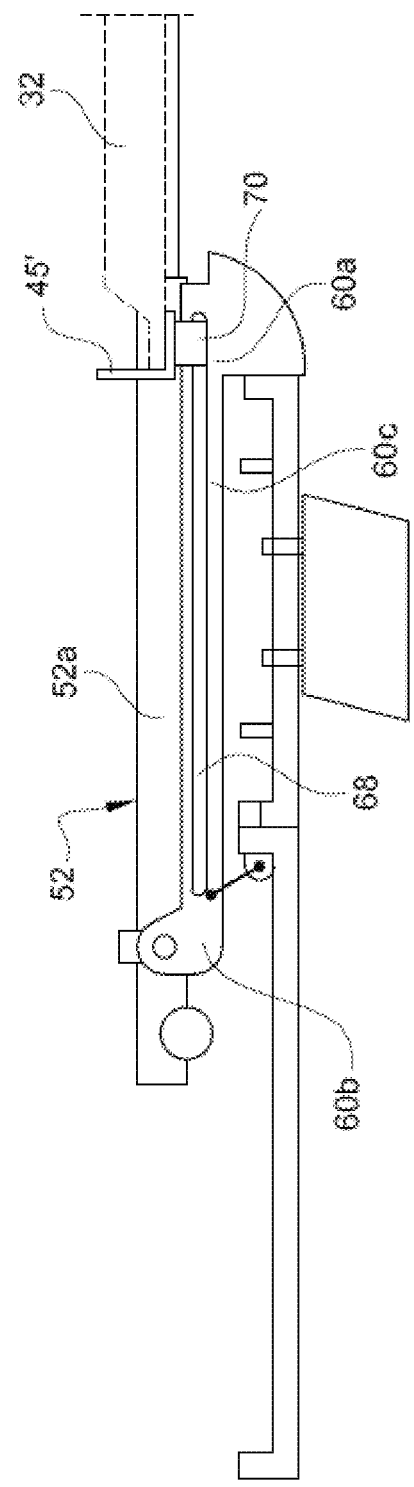
FIG. 12 is a schematic half-view in longitudinal section of a front part of the propulsion unit shown in FIG. 12, with the reverser in reverse thrust configuration.

The direct thrust configuration is also shown in FIGS. 7 and 9A, 9B and 9C, while the rearward reverse thrust position of the movable structure 29 is also shown in FIGS. 8 and 10. All these FIGS. 7 to 10 represent a first preferred embodiment of the invention.

In FIG. 8, it is shown that the rear vane support structure 45, located directly upstream of the reverser cowl (not shown), reveals upstream a passage opening 56' in the secondary flow path 21B, towards the cascade vanes 32. The opening 56' is therefore also delimited upstream by the deflection edge 46', which flares radially outwards towards the rear, in order to delimit an air flow intended to pass through the plurality of vanes 32 when the movable system 29 is in this rearward reverse thrust position. In other words, the deflection edge 46' gradually moves away from the axis A1 from front to rear, in order to guide/divert the air towards the plurality of vanes 32 in reverse thrust configuration.

Several actuators 52 can be associated with each set of vanes 32', but only one of them is shown in FIGS. 7, 8 and 9C, while two actuators 52 are shown in FIGS. 9A, 9B and 10.

One of the features of the invention lies in the fact that an actuator support device 58 is associated with each actuator 52. Only one of these actuator support devices will be described below, in association with the actuator 52 thereof, it being understood that all these support devices 58 have an identical or similar design.

The actuator support device 58 includes, at the downstream end thereof, a first connection part 60a for its connection to the deflection edge 46', into which this part 60a can also be integrated. According to alternatives which are not shown, the first connection part 60a could be fixed on the outer shell 40', preferably in a downstream part thereof, or even at the interface between the outer shell 40' and the deflection edge 46'. In all cases, these elements 40' and/or 46' form a support structure for the first connection part 60a of the actuator support device 58.

The device 58 also includes, at the upstream end thereof, a second connection part 60b for its connection to a body 52a of the actuator 52, corresponding for example to the cylinder in the case of a jack. As shown in the figures, the second connection part 60b cooperates with a rear end portion of the body 52a of the actuator 52. This second connection part 60b is arranged around the fan casing 11, in the vicinity of a junction flange of this casing 11 with the outer shell 40' of the intermediate casing. This allows the support device 58 and the associated actuator 52 thereof to remain spaced axially, towards the downstream, from a more central area of the fan casing 11, subject to deformation in the case of an FBO type event on the fan. In this regard, it is noted that the second connection part 60b cooperates with the rear end portion of the body 52a via a cardan connection 62.

Furthermore, a central part 60c of the actuator support device 58, in the form of an axial beam, travels upstream from the first connection part 60a towards the second connection part 60b. Moreover, it is the entire actuator support device 58 which is in the general form of an axial beam, extending parallel or substantially parallel to the axis A1.

In the radial direction relative to the axis A1, the central part 60c extends at least partially, and preferably entirely, between the outer shell 40' and the actuator 58. The beam 60c therefore runs along these elements 40', 58, having an axial length greater than that of the shell 40' around which it is located.

This beam 60c could be cantilevered upstream from the first connection part 60a, but in this first preferred embodiment of the invention, one or more support members in the form of connecting rods 64 are directly mounted at the second connection part 60b. They preferably cooperate with the downstream flange of the fan casing 11, or even with a connecting member secured to this casing and located close to this downstream flange.

According to another feature of the invention, the actuator support device 58 forms guide means for the set of vanes 32', whose rear frame 45 is connected to the actuator 52 supported by this same device 58.

Preferably, the actuator support device 58 has no mechanical connection with the fan cowls and other nacelle cowls.

In the first preferred embodiment of the invention, the guide means includes an axial guide track 66 formed on a radially outer surface of the central part 60c of the support device 58. This track 66 cooperates with a complementary axial guide track 66a provided on the set of vanes 32' which it guides. More specifically, the complementary track 66a is formed on a radially inner surface of the axial inter-vane element 47' crossed by the actuator 52, and on either side of which two vanes 32 of the set of vanes 32' are arranged.

As is best shown in FIGS. 7 and 9A, in the advanced direct thrust position of the set of vanes 32', the track 66 of the support device 58 supports all or almost all the axial inter-vane element 47'. However, in the rearward reverse thrust position shown in FIG. 8, only a rear end of the track 66 cooperates with a front end of the complementary rearward track 66a.

In this first preferred embodiment, the front vane support frame 45' can thus remain continuous in the circumferential direction 43, all along the assembly 32' to which it belongs.

According to a second preferred embodiment shown in FIGS. 11 to 15, the guide means includes an axial guide lumen 68, which preferably extends over the entire length of the central part 60c of the support device 58, or over substantially all this part. The lumen 68 opens circumferentially on either side of the beam 60c, respectively on the sides of the two adjacent angular sectors 45'a of the front vane support frame 45'. These two angular sectors 45'a are those which are respectively located on either side of the actuator 52 in the circumferential direction 43, and they are connected to each other by a sliding bridge 70 movably housed in the lumen 68, in the axial direction.

The other characteristics of the second embodiment are identical or similar to those of the first embodiment, and in the figures, the elements which bear the same numerical references correspond to identical or similar elements.

Figure 13B:
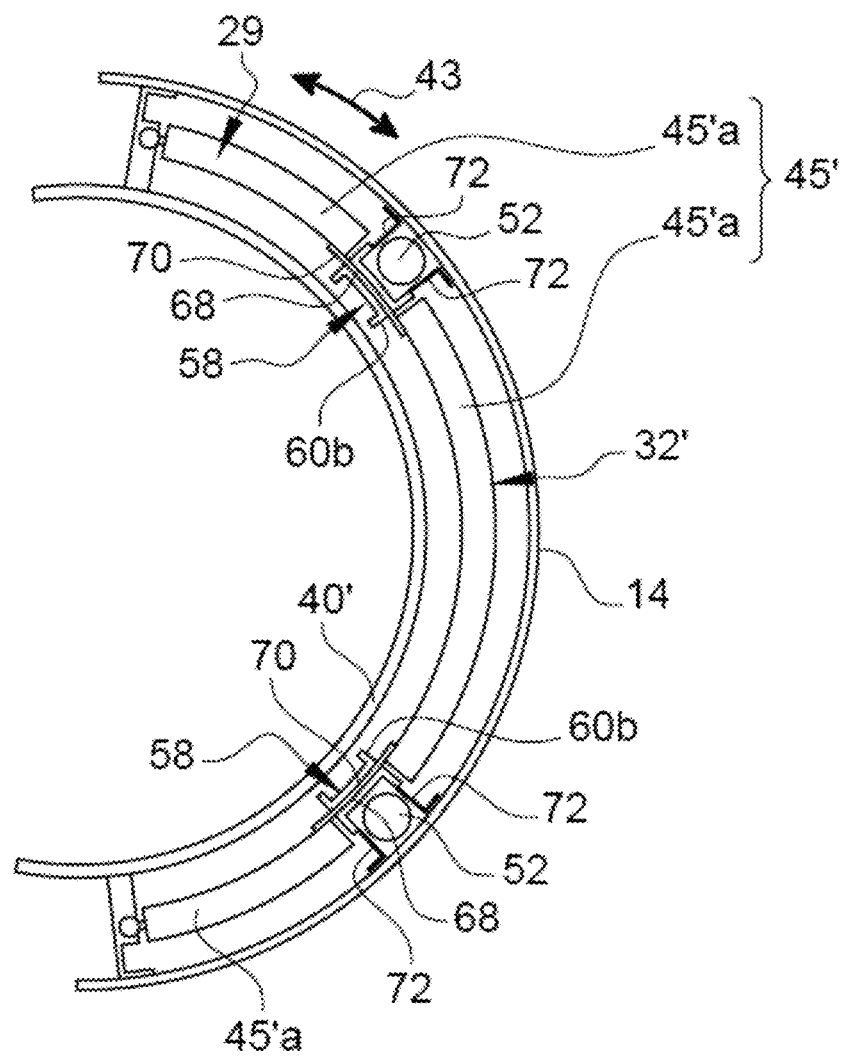
FIG. 13B is a sectional view taken along the line XIIIB-XIIIB of FIG. 13A.
Figure 13C:
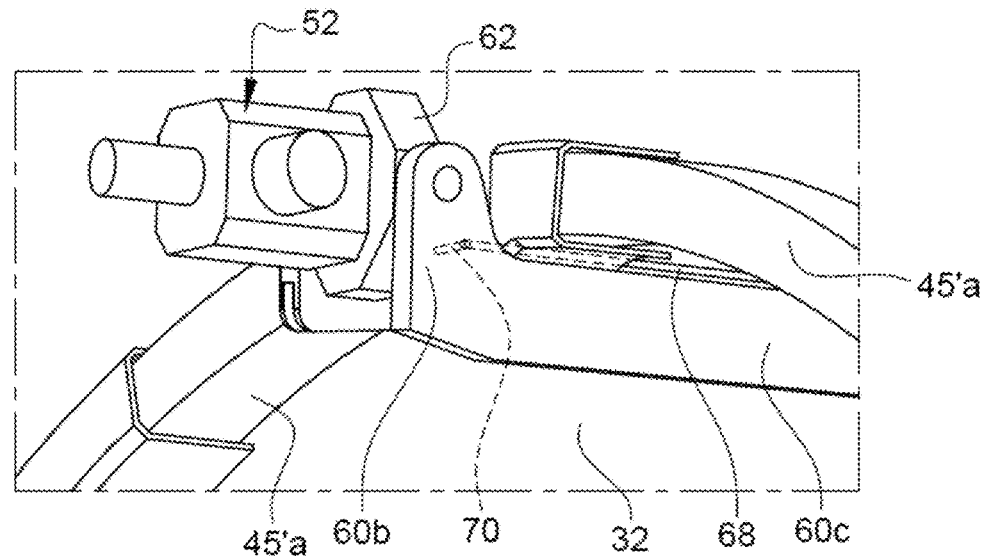
FIG. 13C is a perspective view of part of the reverser shown in FIGS. 11 to 13B.
Figure 14:
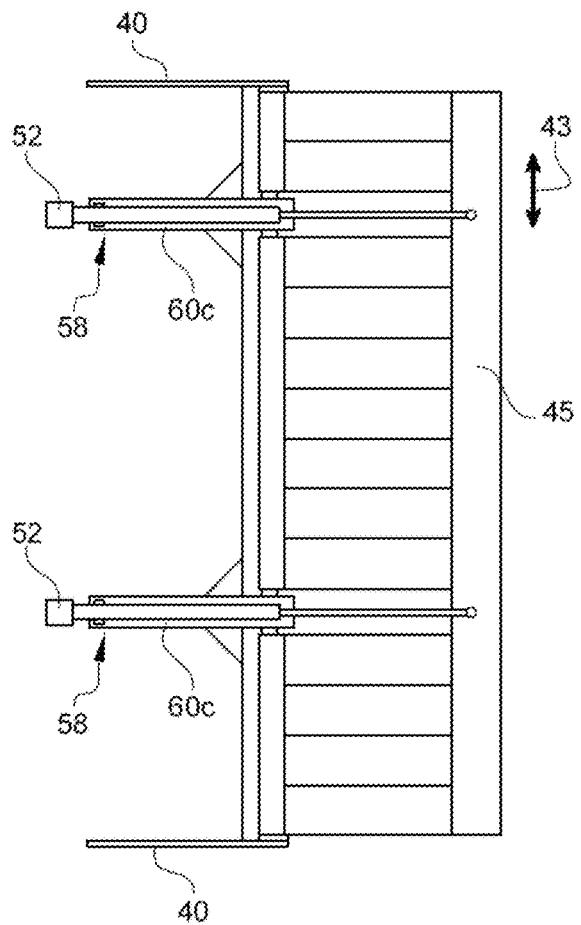
FIG. 14 is a side view similar to that of FIG. 13A, with the reverser in rearward reverse thrust configuration.
Figure 15:
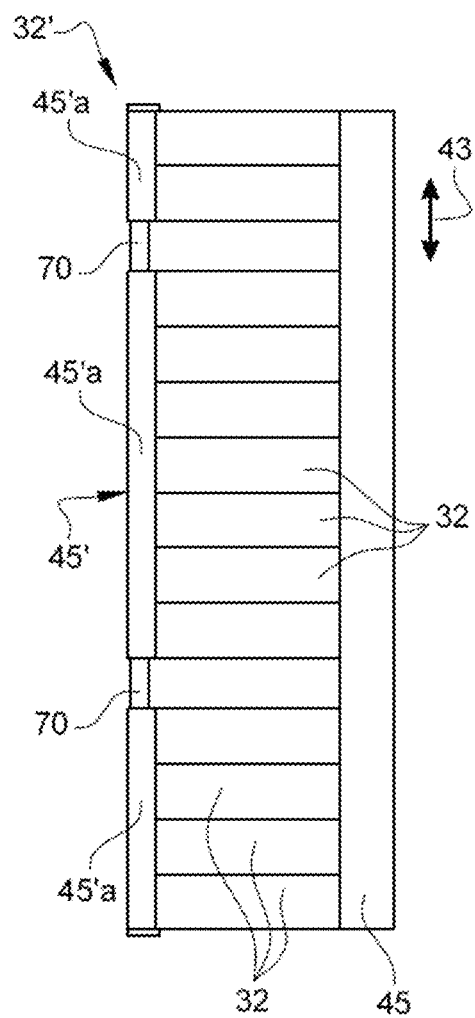
FIG. 15 is a side view similar to that of FIG. 14, representing only the set of vanes of the reverser.
Figure 16:
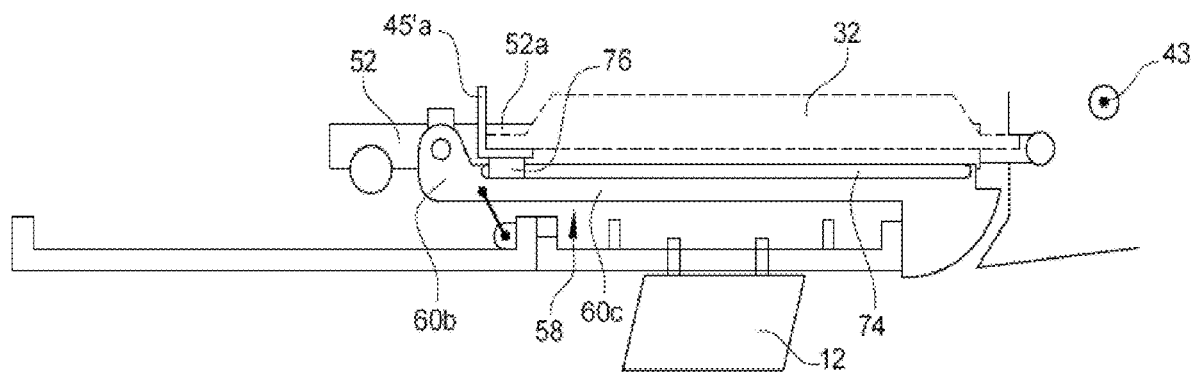
FIG. 16 is a schematic half-view in longitudinal section of a front part of the propulsion unit shown in FIG. 1, more detailed and according to a third preferred embodiment of the invention, and still with the reverser in direct thrust configuration.
Figure 17:
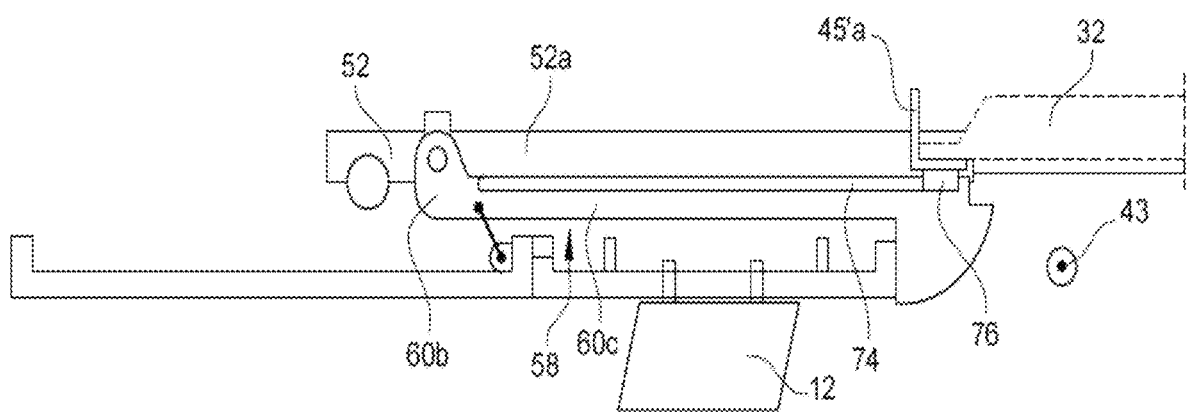
FIG. 17 is a schematic half-view in longitudinal section of a front part of the propulsion unit shown in FIG. 16, with the reverser in reverse thrust configuration.

In this second preferred embodiment, the proposed design has the advantage of arranging one or more fixed members 72 for supporting the fan cowl 14, shown in FIG. 13B. Each support member 72 is carried by the actuator support device 58, for example by the central beam 60b thereof, and it passes through a space between one of the front frame angular sectors 45'a and the actuator 52. In this manner, it can protrude radially outwardly relative to the set of vanes 32', until forming a fixed radial bearing for the fan cowl 14 facing it. During the movement of the movable structure 29, the set of vanes 32' therefore moves relative to these support members 72, remaining fixed.

A third preferred embodiment of the invention, similar to the second, is shown in FIGS. 16 to 20. In this second embodiment, the guide means includes two axial guide rails 74, which each extend preferably over the entire length of the central part 60c of the support device 58, or over substantially all this part. The two rails 74 are respectively arranged on two circumferentially opposite flanks of the central part 60c. In the representation of FIGS. 16 to 18B, 19A and 20, the rails 74 have a recess/a channel each receiving a sliding member of complementary shape 76. In another embodiment shown in FIGS. 18C and 19B, the recess/the channel is no longer on the rails 74, but conversely on the sliding members of complementary shape 76, secured to the circumferential ends of the angular sectors of the front support frame 45'.

Indeed, regardless of their embodiment, the two sliding members 76 are respectively secured to the two adjacent angular sectors 45'a of the front frame 45', namely those arranged on either side of the actuator 52 according to the circumferential direction 43.

In this third preferred embodiment, the adjacent angular sectors 45'a of the front frame 45' are therefore independent of each other, and they connect several vanes 32 of the assembly 32' to each other.

Figure 18A:
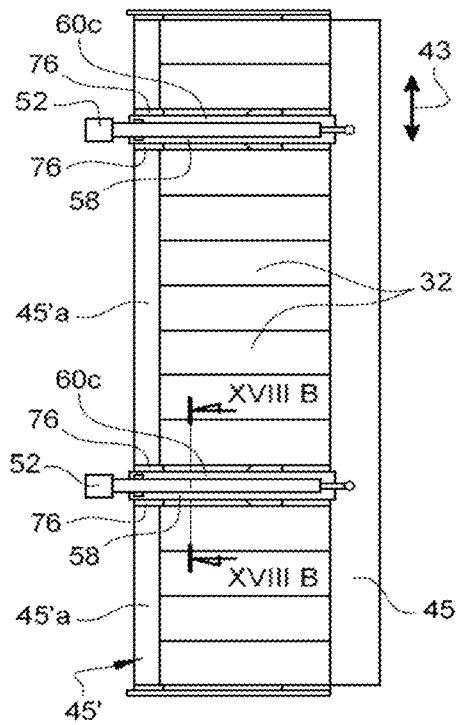
FIG. 18A is a side view of the reverser fitted to the front part shown in FIGS. 16 and 17, shown in direct thrust configuration.
Figure 18B:
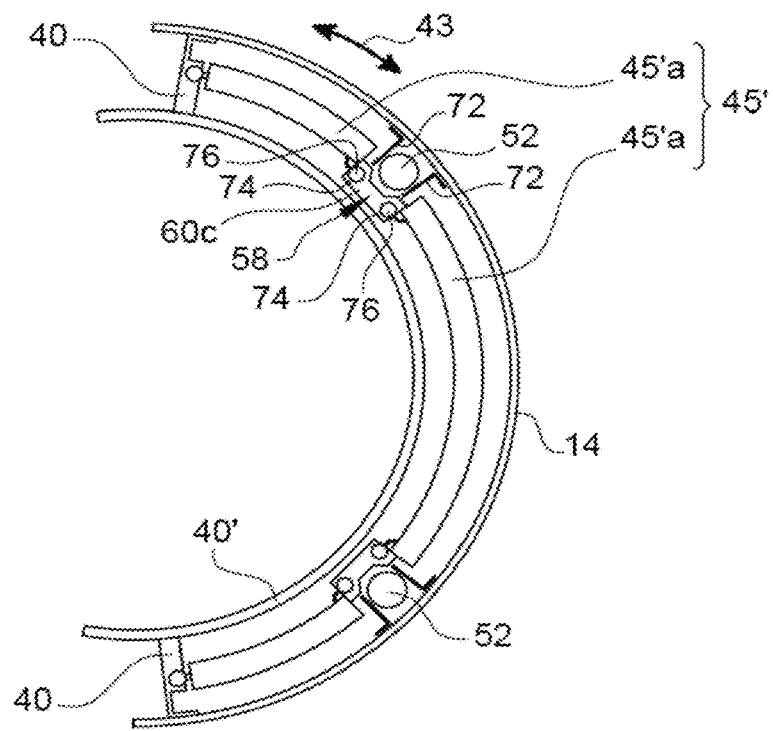
FIG. 18B is a sectional view taken along the line XVIIIB-XVIIIB of FIG. 18A.
Figure 18C:
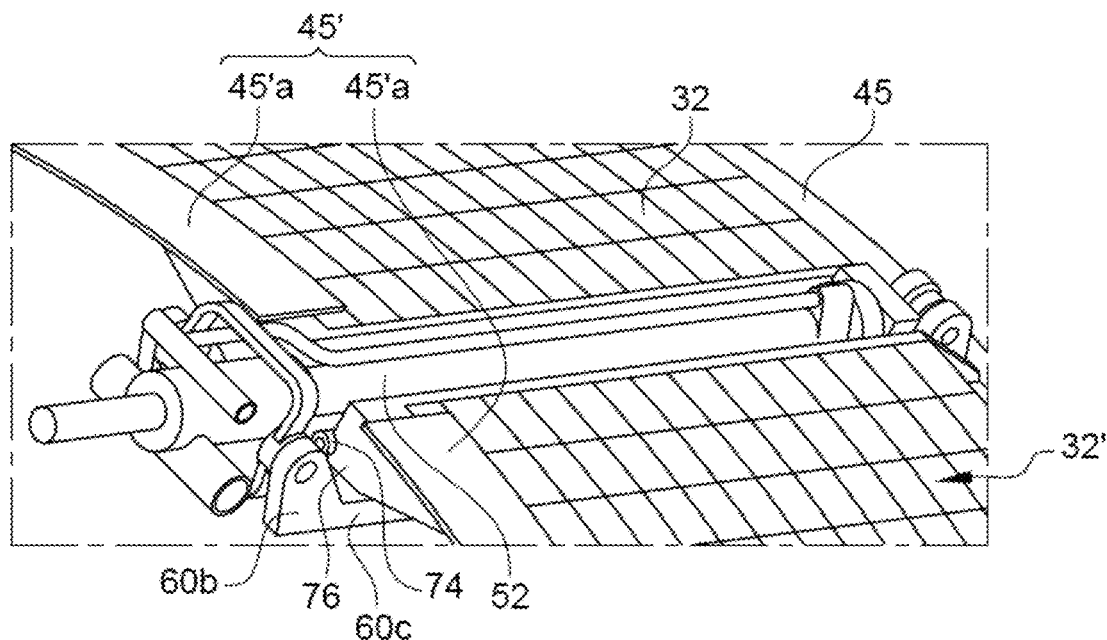
FIG. 18C is a perspective view of part of the reverser shown in FIGS. 16 to 18B, with the reverser in direct thrust configuration.
Figure 19A:
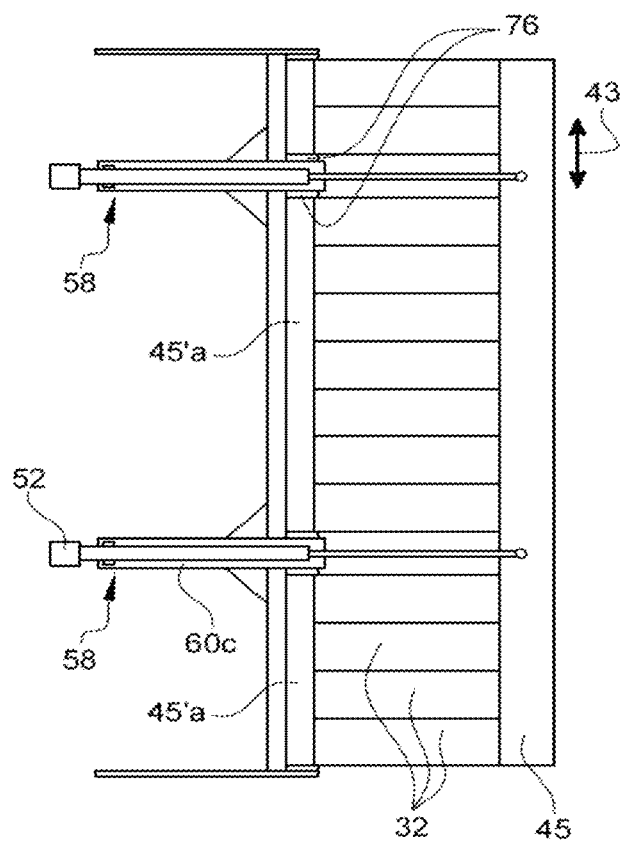
FIG. 19A is a side view similar to that of FIG. 18A, with the reverser in rearward reverse thrust configuration.
Figure 19B:
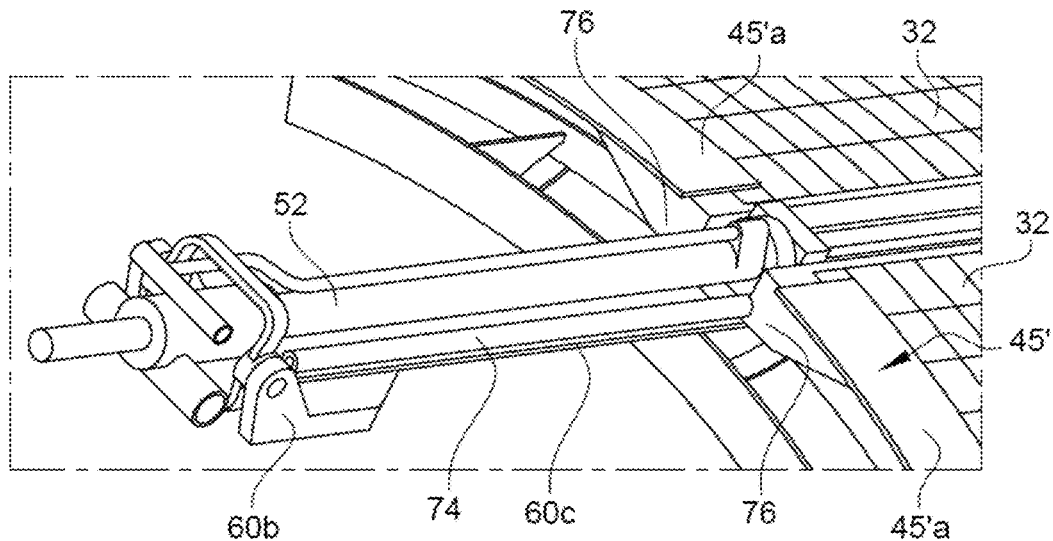
FIG. 19B is a perspective view similar to that of FIG. 18C, with the reverser in rearward reverse thrust configuration.
Figure 20:
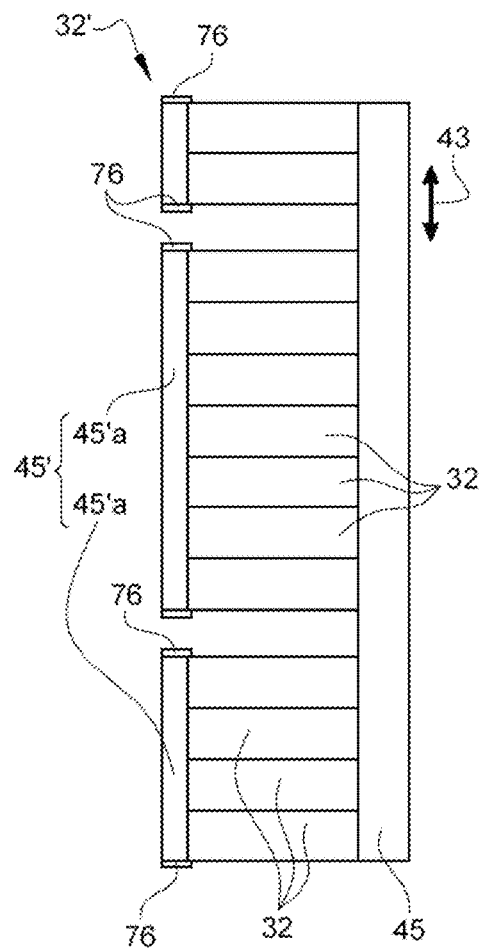
FIG. 20 is a side view similar to that of FIG. 19A, showing only the set of vanes of the reverser.

Here too, it is possible to arrange one or more fixed members 72 of fan cowl support 14, shown in FIG. 18B. Each support member 72 is carried by the actuator support device 58, for example by the central beam 60b thereof, and it passes through a space between one of the independent angular sectors 45'a, and the actuator 52.

Various modifications may be made by a person skilled in the art to the invention that has just been described, by way of non-limiting examples only, the scope of which is defined by the appended claims. For example, the thrust reverser 30 can alternatively have a "C-duct" or "O-duct" structure. Furthermore, all previously described embodiments are combinable, and their characteristics interchangeable.

The invention claimed is:

1. A propulsion unit for an aircraft equipped with a turbomachine and a nacelle comprising a thrust reverser,
   the turbomachine comprising a fan casing extending about a longitudinal central axis of the propulsion unit, and also including a fixed structure equipped with a deflection edge,
   the reverser also comprising a movable structure including a reverser cowl and a set of cascade vanes, the set of vanes comprising a plurality of cascade vanes as well as a rear structure for supporting the vanes on which is fixed a rear end of the plurality of cascade vanes, and a front structure for supporting the vanes on which a front end of the plurality of cascade vanes is fixed,
   the reverser also comprising an actuator for moving the movable structure in translation relative to the fixed structure along the longitudinal central axis of the reverser, between an advanced direct thrust position and a rearward reverse thrust position, the propulsion unit further including an actuator support device,
   wherein the actuator support device includes a first connection part for the connection thereof to a support structure arranged downstream of the fan casing, a second connection part for the connection thereof to a body of the actuator, as well as a central part running axially upstream of the first connection part towards the second connection part, by extending at least partially radially inwardly relative to the actuator,
   and the actuator support device forms a track contacting the set of vanes at all positions between said advanced direct thrust position and said rearward reverse thrust position of the movable structure.

2. The propulsion unit according to claim 1, wherein said support structure is the deflection edge and/or an intermediate casing outer shell fixed to the fan casing and extending the fan casing downstream.

3. The propulsion unit according to claim 2, wherein the actuator support device extends at least partially between the intermediate casing outer shell and the actuator.

4. The propulsion unit according to claim 1, wherein the track includes an axial guide track formed on a radially outer surface of the central part of the actuator support device, the guide track cooperating with a complementary axial guide track provided on the set of vanes.

5. The propulsion unit according to claim 4, wherein the complementary axial guide track is formed on a radially inner surface of an axial inter-vane element arranged between two vanes of the assembly of vanes, the axial inter-vane element preferably taking the form of an axial sheath internally housing at least one part of the actuator.

6. The propulsion unit according to claim 1, wherein the track includes an axial guide lumen crossed by a sliding bridge, connecting two adjacent angular sectors of the front structure for supporting the vanes, the two adjacent angular sectors being arranged on either side of the actuator in a circumferential direction of the propulsion unit.

7. The propulsion unit according to claim 1, wherein the track includes two axial guide rails, cooperating respectively with two complementary sliding members, respectively secured to two adjacent angular sectors of the front structure for supporting the vanes, the two adjacent angular sectors being arranged on either side of the actuator in the circumferential direction of the propulsion unit.

8. The propulsion unit according to claim 1, further comprising at least one member for supporting the actuator support device, connecting the actuator support device to the fan casing, each support member preferably taking the form of a connecting rod.

9. The propulsion unit according to claim 1, wherein the second connection part of the actuator support device cooperates with a rear end portion of the body of the actuator, preferably via a cardan connection.

10. A propulsion unit for an aircraft equipped with a turbomachine and a nacelle comprising a thrust reverser,
the turbomachine comprising a fan casing extending about a longitudinal central axis of the propulsion unit, and also including a fixed structure equipped with a deflection edge,
the reverser also comprising a movable structure including a reverser cowl and a set of cascade vanes, the set of vanes comprising a plurality of cascade vanes as well as a rear structure for supporting the vanes on which is fixed a rear end of the plurality of cascade vanes, and a front structure for supporting the vanes on which a front end of the plurality of cascade vanes is fixed,
the reverser also comprising an actuator for moving the movable structure in translation relative to the fixed structure along the longitudinal central axis of the reverser, between an advanced direct thrust position and a rearward reverse thrust position, the propulsion unit further including an actuator support device,
wherein the actuator support device includes a first connection part for the connection thereof to a support structure arranged downstream of the fan casing, a second connection part for the connection thereof to a body of the actuator, as well as a central part running axially upstream of the first connection part towards the second connection part, by extending at least partially radially inwardly relative to the actuator,
the actuator support device forms guide means for the set of vanes, and
wherein the guide means includes an axial guide track formed on a radially outer surface of the central part of the actuator support device, the guide track cooperating with a complementary axial guide track provided on the set of vanes.

11. The propulsion unit according to claim 10, wherein the complementary axial guide track is formed on a radially inner surface of an axial inter-vane element arranged between two vanes of the assembly of vanes, the axial inter-vane element preferably taking the form of an axial sheath internally housing at least one part of the actuator.

12. A propulsion unit for an aircraft equipped with a turbomachine and a nacelle comprising a thrust reverser,
the turbomachine comprising a fan casing extending about a longitudinal central axis of the propulsion unit, and also including a fixed structure equipped with a deflection edge,
the reverser also comprising a movable structure including a reverser cowl and a set of cascade vanes, the set of vanes comprising a plurality of cascade vanes as well as a rear structure for supporting the vanes on which is fixed a rear end of the plurality of cascade vanes, and a front structure for supporting the vanes on which a front end of the plurality of cascade vanes is fixed,
the reverser also comprising an actuator for moving the movable structure in translation relative to the fixed structure along the longitudinal central axis of the reverser, between an advanced direct thrust position and a rearward reverse thrust position, the propulsion unit further including an actuator support device,
wherein the actuator support device includes a first connection part for the connection thereof to a support structure arranged downstream of the fan casing, a second connection part for the connection thereof to a body of the actuator, as well as a central part running axially upstream of the first connection part towards the second connection part, by extending at least partially radially inwardly relative to the actuator,
the actuator support device forms guide means for the set of vanes, and
wherein the guide means includes an axial guide lumen crossed by a sliding bridge, connecting two adjacent angular sectors of the front structure for supporting the vanes, the two adjacent angular sectors being arranged on either side of the actuator in a circumferential direction of the propulsion unit.

* * * * *